United States Patent [19]

Petrushkin et al.

[11] 3,957,650

[45] May 18, 1976

[54] ACOUSTIC CENTRIFUGE

[76] Inventors: Viktor Dmitrievich Petrushkin, 3 Novo-Ostankinskaya ulitsa, 23, kv. 49, Moscow; Vladimir Fedorovich Tarambula, Pakhrinsky proezd, 12, kv. 92, Podolsk Moskovskoi oblasti; Anatoly Antonovich Nesterovich, Pogonny proezd, 40, kv. 104, Moscow; Boris Georgievich Novitsky, Dubninskaya ulitsa, 45, kv. 30, Moscow; Viktor Mironovich Fridman, Karetny Ryad, 5/10, kv. 180, Noscow; Dmitry Evseevich Shkoropad, Novo-Alexeevskaya ulitsa, 4, korpus 3, kv. 82, Moscow, all of U.S.S.R.

[22] Filed: Mar. 22, 1974

[21] Appl. No.: 454,015

[30] Foreign Application Priority Data

Mar. 27, 1973 U.S.S.R. ............................ 1893107

[52] U.S. Cl. ..................... 210/380 R; 210/DIG. 22; 210/391

[51] Int. Cl.[2] ......................................... B01D 35/20

[58] Field of Search ............210/107, 19, 178, 276, 210/280, 298, 354, 359, 360, 381, 383, 384, 388, DIG. 22, 380, 391

[56] References Cited

UNITED STATES PATENTS

| | | | |
|---|---|---|---|
| 2,165,807 | 7/1939 | Murphree et al. | 210/381 |
| 2,565,159 | 8/1951 | William | 210/DIG. 22 |
| 2,733,855 | 2/1956 | McCoy | 210/360 |
| 2,964,193 | 12/1960 | Heckmann | 210/388 |
| 3,327,401 | 6/1967 | Stames et al. | 210/19 |
| 3,443,696 | 5/1969 | Schutte | 210/391 |
| 3,463,321 | 8/1969 | Van Ingen | 210/388 |
| 3,478,883 | 11/1969 | Deluca, Jr. | 210/388 |
| 3,505,214 | 4/1970 | Bodine | 210/19 |

OTHER PUBLICATIONS

Soviet Progress in Applied Ultrasonics, p. 47, Vol. 2, NOSOV, Consultants Bureau, N.Y. 1965.

*Primary Examiner*—Theodore A. Granger
*Attorney, Agent, or Firm*—Haseltine, Lake & Waters

[57] ABSTRACT

The inventive acoustic centrifuge is used for filtering suspensions and comprises a rotor whose housing has an inlet port and an outlet port located in its opposite end plates in line with a rotor drive shaft. Mounted on the shaft inside the rotor housing is an acoustic transducer which is accommodated in a coaxial chamber and communicating with the outlet port. The side wall of this chamber forms a filtering partition. The emitting surface of an acoustic transducer faces the partition. The diameter of the outlet port is substantially larger than that of the inlet port, but is smaller than the diameter of the emitting surface.

2 Claims, 1 Drawing Figure

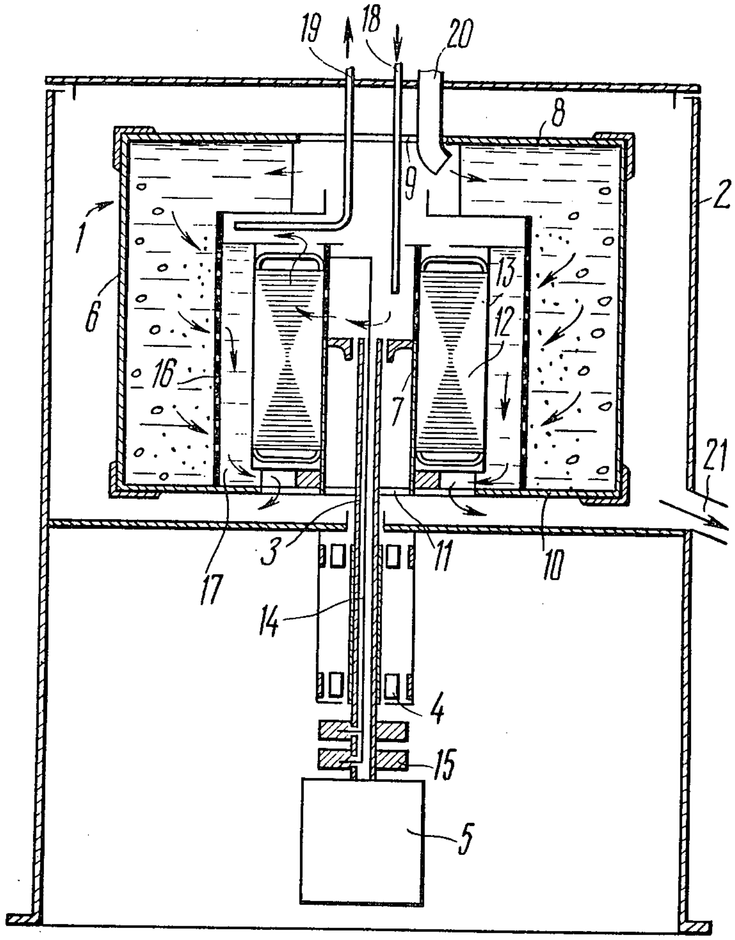
19
18
20
8
9
2
1
6
13
12
16
7
21
3
11
10
17
14
4
15
5

ACOUSTIC CENTRIFUGE

The present invention relates to apparatus for dividing non-homogenous media into fractions; more particularly, to acoustic centrifuges wherein the medium under treatment has a simultaneous effect of two fields, namely a centrifugal and an acoustic field.

The invention may be used with particular advantage for filtering various suspensions and liquids such as lacquers, enamels, juices, beer and ferments.

There are known acoustic centrifuges comprising a rotor having a perforated housing which is cantilever-mounted on a drive shaft.

There is an inlet port in a free end plate of the rotor housing for feeding the product to be separated, while perforations in the housing serve as ports for draining the separated product in the course of rotation of the rotor.

Coaxially mounted on a closed end plate inside the rotor housing is a disk, with an acoustic transducer installed thereon coaxially with the rotor. Mounted at a distance from the interior surface of the rotor is a filtering partition made as a mesh-screen of which a bottom edge is attached to the periphery of the disk. During the operation of the centrifuge the acoustic energy of the transducer is transmitted through the disk to the filtering partition for the purpose of regenerating it, i.e. for the purpose of removing particles of the product under treatment from the filtering partition.

Inasmuch as the acoustic energy of the transducer is transmitted to the filtering partition through an intermediate element — the disk —, the acoustic contact between the two is poor and, therefore, the acoustic field set up in the rotor is not uniform in length. This disadvantage materially affects the regeneration of the filtering partition, with the result that the screen meshes become rapidly clogged with particles of the product under treatment.

Consequently, the acoustic centrifuges known in the prior art suffer from the disadvantage that time has to be lost in cleaning or replacing the filtering partition, the centrifuge useful efficiency being thus adversely affected.

It is an object of the present invention to provide an acoustic centrifuge having a rotor so devised that the filtering partition thereof may be regenerated more effectively than in comparable centrifunges known in the art, the service life of the filtering partition being thereby lengthened, and the invention centrifuge having an increased working capacity and an improved useful efficiency.

This and other objects are achieved in an acoustic centrifuge according to the invention whose rotor comprises a drum-shaped housing mounted on the rotor drive shaft and is provided with inlet and outlet ports. A filtering partition and an acoustic transducer are mounted coaxially in the rotor housing, the emitting surface of the acoustic transducer facing the filtering partition.

According to important features of the invention, the inlet and outlet ports are located in opposite end plates of the rotor housing, in line with the rotor drive shaft. The acoustic transducer is mounted on this drive shaft and is accommodated in an annular chamber, the outer wall of which is formed by the filtering partition. The annular chamber communicates only with the outlet port. The diameter of the outlet port is substantially larger than that of the inlet port, but is less than the diameter of the emitting surface of the acoustic transducer.

This constructional arrangement provides for a more effective and uniform regeneration of the filtering partition since the acoustic energy acts upon the partition in the so called "nearest" acoustic field of the transducer, through the medium of the filtered material which completely fills the chamber around the transducer during the operation of the centrifuge.

The required pressure differential across the filtering partition is obtained by establishing proper relationship between the diameters of the inlet port, the outlet port and the surface of the transducer emitting surface.

The "nearest" acoustic field features a volumetrically developed cavitation and acoustic oscillations of high intensity, these factors being of primary importance as regards the regenerating effect of acoustic oscillations on the centrifuge filtering partition.

It is suggested by the invention to make the length of the emitting surface of the acoustic transducer essentially equal to that of the filtering partition, in order to obtain maximum regenerating effect.

A thin-walled cup of a corrosion-resistant material may be fitted on the emitting surface of the acoustic transducer over the entire length thereof in order to protect the transducer against effects of aggressive materials under treatment, and also to amplify the basic acoustic emission toward the filtering partition.

Now an embodiment of the invention will be described in detail with reference to the accompanying drawing, the sole FIGURE of which schematically shows a vertical section of an exemplary acoustic centrifuge constructed according to the invention.

The acoustic centrifuge which constitutes the present invention is designed for filtering suspensions.

The centrifuge comprises a rotor 1 enclosed in a case 2 and mounted on the upper end of a hollow shaft 3 supported vertically in two bearings 4.

The lower end of the shaft 3 is connected to a shaft of an electric motor 5 which is mounted in the lower part of the case 2 and serves the purpose of providing drive for operation of the centrifuge.

The rotor 1 comprises a drum-shaped housing 6 mounted on the shaft 3 by means of a hub 7. A top end plate 8 of the rotor housing 6 is provided with an inlet port 9 for feeding the liquid or product to be separated. A bottom end plate 10 of the rotor housing 6 is provided with an outlet port 11 for draining the purified liquid (filtrate).

According to the invention, the inlet port 9 and the outlet port 11 are located in line with the shaft 3, the diameter of the outlet port 11 being substantially larger than that of the inlet port 9. This constructional arrangement provides the necessary pressure differential across the rotor between the ports 9 and 11 which gives rise to a moving force of the filtering process.

Mounted inside the rotor housing 6 on the hub 7 is an acoustic transducer 12 constructed in the form of a cylindrical laminated stack having a through axial passage to fit over the hub 7.

Fitted over the outer (emitting) surface of the acoustic transducer 12 is an optional thin-walled cup 13, made of a corrosion-resistant material. The function of the cup 13 is to protect the acoustic transducer 12 from the effects of aggressive materials under treatment and also to serve as an acoustic membrane to amplify the basic transducer emission, directed radially towards the housing 6 of the rotor 1.

In addition, the basic acoustic emission is amplified by virtue of an air cushion inside the transducer 12.

Electric power is supplied to the acoustic transducer 12 through a cable 14 which runs inside the shaft 3 and connects to a high-frequency current collector 15 mounted on the output shaft of the electric motor 5.

According to the invention, the acoustic transducer 12 is mounted inside a cylindrical chamber, coaxially therewith. The side wall of the chamber is formed by the filtering partition 16 the lower edge of which is attached to the bottom end plate 10 of the rotor housing 6.

An annular space 17 is formed in the chamber between the cup 13, which is fitted on the emitting surface of the acoustic transducer 12, and the partition 16, the space communicating with the outlet port 11 in the housing 6. The space between the wall of the rotor housing 6 and the filtering partition 16 communicates with the inlet port 9 in the housing 6.

According to the invention, the length of the outer emitting surface of the acoustic transducer 12 (the length of the cup 13) is preferably substantially equal to the length of the filtering partition 16, the diameter of the emitting surface (the diameter of the cup 13) being larger than the diameter of the outlet port 11 in the rotor housing 6.

For cooling the acoustic transducer 12 when treating a hot liquid, a pipe 18 is fitted in a hole provided in the top end plate of the case 2. The pipe 18 fits through the inlet port 9 in the rotor housing 6 for the purpose of supplying a coolant into the hub 7, from where it flows between the laminations of the acoustic transducer 12 and, on picking up heat, goes out by way of an outlet pipe 19.

Also fitted in the top end plate of the case 2 is a pipe 20 to feed the product to be separated into the inlet port 9 of the rotor housing 6. The filtered material leaves the centrifuge by way of a pipe 21 provided in the case 2.

The centrifuge operates on the principle of reverse filtration which means that the liquid under treatment flows in the direction opposite to that of the centrifugal forces set up in the rotor 1 by virtue of its rotation.

With the electric motor 5 switched on, its output shaft drives the shaft 3 together with the rotor 1 mounted thereon.

The liquid to be separated is continuously fed through the pipe 20 and the inlet port 9 into the rotor case 6. Filling the rotor case interior, the liquid passes through the filtering partition 16.

During this filtration process the larger foreign particles are deposited on the interior surface of the rotor case 6 by the action of the centrifugal forces arising in the rotor 1, whereas the smaller particles are retained by the filtering partition 16. The separated liquid fills the annular space 17 between the filtering partition 16 and the cup 13 fitted on the acoustic transducer 12, wherefrom it drains by way of the outlet port 11 and the pipe 21 into a receptacle (not shown).

Due to the pressure differential across the filtering partition 16 resulting from the relationship established according to the invention between the diameters of the inlet port 9, the outlet port 11 and the emitting surface of the acoustic transducer 12 (the cup 13), the separated liquid, on passing through the partition 16, fills up the annular space 17. This provides for an effective acoustic contact between the emitting surface of the transducer 12 and the filtered liquid; by virtue of which acoustic oscillations are transmitted to the entire surface of the filtering partition 16, with consequent improvement of the effectiveness of the regeneration of the partition.

The effectiveness of the partition regeneration is also improved due to the fact that by virtue of reverse filtration, the small foreign particles are deposited on the outer side of the partition 16 and the deposit is acted upon by the acoustic and centrifugal fields simultaneously, whereby complete regeneration of the filtering partition 16 is ensured.

The effective regeneration of the filtering partition 16 reduces the resistance offered by the partition to the liquid flow, thereby providing for long uninterrupted operation of the centrifuge, and increasing the working capacity thereof.

What is claimed is:

1. An acoustic centrifuge for separating liquids, comprising: a drive shaft; a rotor having a drum-shaped housing coaxially mounted on said drive shaft and having inlet and outlet ports in opposite end plates of said housing, in line with said drive shaft; a chamber being formed inside said housing and having a side wall coaxial therewith, which side wall constitutes a filtering partition; and an acoustic transducer mounted on said drive shaft and accommodated in said chamber, an emitting surface of said transducer facing said partition and being coaxial therewith; said chamber communicating only with said outlet port, the diameter of the latter being substantially larger than that of said inlet port, but smaller than that of said emitting surface, resulting in a pressure differential, between a liquid to be separated and a resulting filtrate, across said partition so that said chamber is kept filled up with the filtrate during the operation of the centrifuge, as a consequence of which uniform acoustic contact is established between said emitting surface and said partition, resulting in an effective regeneration of said partition.

2. The centrifuge as defined in claim 1, wherein the length of said emitting surface is substantially equal to that of said partition.

* * * * *